Feb. 9, 1960 D. W. TURNER 2,924,637
INSULATOR STRUCTURE
Filed Dec. 5, 1957

INVENTOR.
DELBER W. TURNER

BY HIS ATTORNEYS.
HARRIS, KIECH, FOSTER & HARRIS

United States Patent Office 2,924,637
Patented Feb. 9, 1960

2,924,637

INSULATOR STRUCTURE

Delber W. Turner, Houston, Tex., assignor to Petrolite Corporation, Wilmington, Del., a corporation of Delaware Application December 5, 1957, Serial No. 700,816

16 Claims. (Cl. 174—31)

My invention relates to insulator structures, typically suspension insulators or bushings adapted to be used in conjunction with high-voltage electric equipment.

Certain types of electric equipment require that the insulator structure operate without short-circuiting or substantial surface conductivity in an oil zone containing or communicating with oil carrying substantial amounts of impurities. For example, the oil may be contaminated with particles of conducting material dispersed therein in amount at least about .001%, sometimes considerably more. Such problems are encountered, for example, in insulating and conducting high voltages to the electrodes of an electric treater designed to resolve petroleum emulsions, in which capacity the invention will be currently exemplified although it is applicable to other equipment where an insulator structure is exposed to oil containing appreciable amounts of conducting contaminants.

In such instances, the surface material of the insulator structure, exposed to the contaminated oil, is of importance. It has been found that polytetrafluoroethylene (available under the trade-name "Teflon") or polytrifluorochloroethylene (available under the trade-name "Kel-F") has unexpected advantages when used in such environments. The contaminating particles do not wet the surface of such materials and arcing or "treeing" problems are solved.

On the other hand, insulator structures embodying such materials are sometimes required to operate under extremely high temperatures and pressures. Thus, some electrical equipment requires adequate insulation at pressures as high as 350 p.s.i. and temperatures as high as 335° F. or higher. For example, electric desalting treaters recently have been required to operate at the feed temperatures and pressures of the subsequent furnace, such treaters being on-stream with the furnace and its tower or related equipment. The aforesaid materials tend to soften and flow under pressure at temperatures considerably less than 335° F.

It is an object of the invention to provide insulator structures containing such materials, or other materials softening under high temperature, which structures are operative to effectively insulate connected components at temperatures and pressures tending to soften or cause plastic flow of such materials. The preferred insulator structures to be described are designed to withstand temperatures as high as 370° F. or higher under pressures of 350 p.s.i. or more. They are conventionally subjected to initial test under such temperature and pressure; also to a cold water test at 2,200 p.s.i.

It is an object of the invention to provide a composite insulator structure including a core member made of a first electric insulation material of relatively high strength and rigidity under the conditions of high temperature and pressure involved, and a tubular or cover member made of a second electric insulation material of relatively low strength and rigidity at such temperatures and pressures, this tubular member being preferably polytetrafluoroethylene or polytrifluorochloroethylene. The core member can then be made to give support to the tubular member while still forming the mechanical-load-carrying element of the structure, which is a feature of the invention.

It has been found, however, that best results are obtained only if the pressures inside and outside the tubular member are substantially equalized. If this is not done, the softened material of the tubular member may distend, flow or rupture. It is an object of the present invention to provide an insulator structure in which the pressures inside and outside an outer tubular member are equalized. A further object is to pressurally expose the opposite ends of an annular space between the core and tubular members to an oil zone subject to changes in pressure.

If the insulator structure is subjected to wide variations in pressure, there is a tendency to force the contaminated oil or any residual test material, such as water, into the space between the core member and the outer tubular member, forming a conductive path or reducing the resistivity of the unit to such extent that flash-over or current leakage takes place. It is an object of the invention to prevent this by filling the aforesaid annular space with a dielectric liquid exposed pressurally at both ends of the annular space to the pressure in the oil zone. In the preferred embodiment it is an object to separate such dielectric fluid from the fluid of the oil zone by a pair of pressure transfer members.

It is a further object to seal internal spaces between the core member and tubular member against entry of electrically conductive materials by one or more barrier-type seals, typically piston-like seals which are displaceable by pressure differences to equalize same while sealing the internal passages of the insulator structure. A further object of the invention is to use O-rings in this connection.

A further object is to mount the outer tubular member for relatively free expansive and contractive movement relative to the core member; also to employ the annular sealing members to aid in the supporting of the tubular member. In general, it is an object of the invention to protect the outer tubular member from disruptive or displacement forces while operating under softening temperatures.

Further objects and advantages of the invention will be apparent to those skilled in the art from the following description of exemplary embodiments.

Referring to the drawing.

Figure 1:
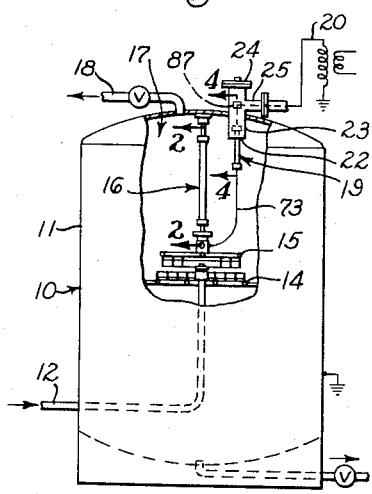
Fig. 1 is a diagrammatic view of a piece of electric equipment, namely a high-voltage electric treater for emulsions, equipped with two embodiments of the invention.

Fig. 1 illustrates a conventional electric emulsion treater 10 including a tank 11 receiving emulsion through a pipe 12. This emulsion is oil-continuous and contains dispersed particles of conducting material. It is typically a crude oil emulsion or an emulsion synthesized by adding water or chemical agents to crude or refined oils. The emulsion is sprayed outwardly between electrodes 14 and 15, respectively connected to the tank 11 and supported by the lower end of a suspension insulator structure 16 of the invention. The treated emulsion separates into a body of dispersed-phase material, withdrawable from the bottom of the tank 11 as shown, and a body of treated oil rising to an oil zone 17 and withdrawable through a pipe 18, the treated oil containing .001% or more residual dispersed-phase material. The requisite high-voltage potential is applied to the electrode 15 through an insulator structure 19 constructed as an inlet bushing, the potential being derived from a high voltage transformer 20 or other high-voltage source. The insulator structure 19 is supported by a bottom wall 22 of an outwardly open housing 23 welded intermediate its ends to the top wall of the tank 11 and closed at its upper end by a plate 24. The high voltage conductor leading to the transformer 20 extends laterally through a side pipe 25.

Figure 3:
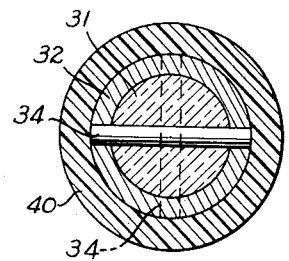
Fig. 3 is a transverse sectional view taken along the line 3—3 of Fig. 2.
Figure 2:
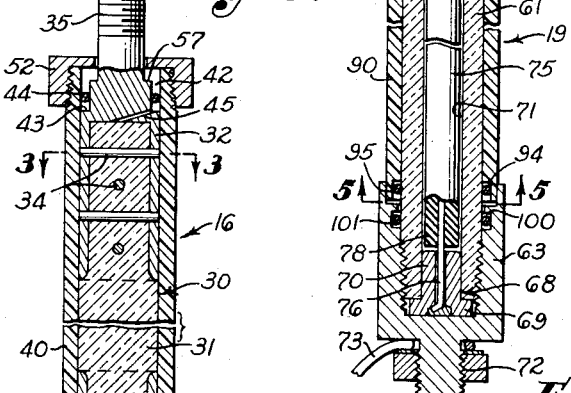
Fig. 2 is a vertical sectional view taken along the line 2—2 of Fig. 1 and illustrates a first embodiment of the invention as applied to stick insulator of the suspension type.

Referring particularly to Figs. 2 and 3, the suspension insulator structure 16 includes an elongated core member 30 comprising an elongated central section 31, formed of a first electric insulation material, and upper and lower end members 32 and 33 made of metal. The elongated core member 30 carries the supported load, e.g., the electrode 15 and its connected equipment. Therefore the central section 31 should be formed of electric insulation material of relatively high strength and rigidity at the high temperatures and pressures under which it will be required to operate. Such a material may be a ceramic, synthetic resin or other material but is preferably a glass laminate formulated with a suitable resin such as a resin made from silicone. A silicone fiber glass laminate made up of successive layers of glass cloth will be found very satisfactory, as will a number of other glass laminates or rods made of resins containing fillers such as glass fibers, mica or other known materials.

The ends of the central section 31 are machined to produce reduced diameter portions receiving the caplike end members 32 and 33 which are rigidly secured in place by pins 34 extending therethrough and through the reduced diameter portions in crossing directions. The end members 32 and 33 have threaded portions 35 and 36 respectively connected to the tank wall and to the electrode 15 to suspend the latter from the former. The electrode may be hung from a support member 36a connected by legs 37 to a nut 38 threaded on the portion 36, the latter receiving a cotter pin 37a locking the structure in desired adjustable position. Sometimes two or more of the suspension insulator structures 16 are employed to support and stabilize the electrode 15.

Fitting over the circular periphery of the core member 30 is a tubular member 40 forming an important part of the invention. This tubular member is made of a second insulation material of relatively low strength and rigidity at the high temperatures and pressures under which it will be required to operate. If operation is to be in the presence of the aforesaid oils contaminated by dispersed conducting particles, the tubular member should desirably be formed of a material selected for its surface properties, e.g., its ability not to become wetted by oil or aqueous materials and its ability to resist surface leakage, arc-over or the "treeing" encountered with rubber or ceramic surfaces. The preferred materials are polytetrafluoroethylene or polytrifluorochloroethylene which are about equally good at temperatures below about 200° F. At higher temperatures, polytetrafluoroethylene should be used as it has been found that the commercially available polytrifluorochloroethylene will disintegrate at the higher temperatures previously mentioned, sometimes completely fragmenting into discrete masses and thereby exposing the core members 30 to the contaminated oil with consequent electrical failure. Polytetrafluoroethylene is not subject to such heat failure and stands up well at the test and operating temperatures previously mentioned.

Depending on the material selected for the tubular member 40, it will soften and be subject to plastic flow at high temperatures to such extent that it cannot be anchored satisfactorily by threading, clamping or by any known adhesive. Further, it will thermally expand and contract at a rate usually different from the core member 30. To cure or compensate for these effects the sealing and pressure equalizing mounting of the member 40, now to be described, has been found to be very desirable and effective.

The tubular member 40 is cylindrical and may initially fit relatively snugly around the core member 30, leaving only a narrow annular space therebetween, sometimes a space of capillary dimensions. The relative diameters may be such as to support the tubular member at least in part from the core member against dropping therefrom when in vertical position. This tubular member 40 is relatively thick and is desirably sealed near its ends to the core member by means which, if desired, can aid in supporting the tubular member.

As shown, one of the members 30 and 40 is relieved to cooperate with the other in defining an upper annular chamber 42 communicating with the upper end of the annular space between the core member 30 and the tubular member 40. This is best accomplished by turning the end member 32 to a smaller diameter adjacent the threaded portion 35, leaving a shoulder 43 bounding the inner end of the chamber 42. A piston like pressure-transfer element in the form of an O-ring 44 of resilent material fills a cross-section of the annular chamber 42 at a position between the ends thereof. A passage 45 connects the inner end of the chamber 42 with the interior of the end member 32 and transmits pressure from the chamber directly to the end face of the central section 31 of the core member 30. At the lower end of the structure the end member 33 is similarly relieved to form a lower annular chamber 46 bounded by a shoulder 47 and containing a similar O-ring 48 occupying the chamber 46 at a position between its ends. A passage 49 connects the inner end of the chamber 46 with the interior of the end member 33 as before.

Desirably an incompressible fluid fills the narrow annular space between the members 30 and 40, the inner ends of the annular chambers 42 and 46 inside the O-rings, the passages 45 and 49, and all internal spaces of this portion of the structure between the levels of the O-rings. Thus any increase in ambient pressure is transmitted to the fluid to substantially equalize the pressures inside and outside the tubular member 40 with a minimum of movement of the O-rings or either of them. The incompressible fluid is desirably a liquid, typically a silicone grease. If the annular space is small, the core member 30 can be coated with silicone grease during assembly with the tubular member 40, the inner portions of the annular chambers and other internal passages being filled later. The O-rings prevent contamination of the dielectric by the ambient impure oil and in this sense serve as a seal therebetween. Other pressure-transfer seals can be used and it has also been found possible in some instances to dispense with the O-rings or any members separating the dielectric fluid from the surrounding contaminated oil. This is particularly true where the annular space is so minute as to retain the dielectric liquid therein during operation of the structure and where it is immiscible with the oil or its contaminants. Equalization of the end pressures on the dielectric liquid prevents its pressural displacement and thus prevents the contaminated oil from entering the annular space and short-circuiting the structure.

At least one of the ends of the tubular member 40 should desirably be free to move relative to the core member 30 to accommodate relative movement due to thermal expansion and contraction. As shown, upper and lower end caps 52 and 53 are respectively connected to the ends of the tubular member 40, as by threading, but no attempt is made to seal between them and the end members 32 and 33. The ambient contaminated oil is thus in pressural communication with the outer faces of the O-rings 44 and 48. An adjustable nut 55, secured in desired position to the threaded portion 36 by a set screw 56, limits the lowermost position of the end cap 53 and thus the tubular member 40 and may support some or substantially all the weight of the latter. The nut is initially adjusted to permit both expansive and contractive movement of the upper end of the member 40 and its end cap 52 relative to the core member 30, e.g. so that the top wall of the end cap 52 is above a shoulder 57 of the end member 32 and loosely surrounds the portion 35 thereof.

Figure 4:
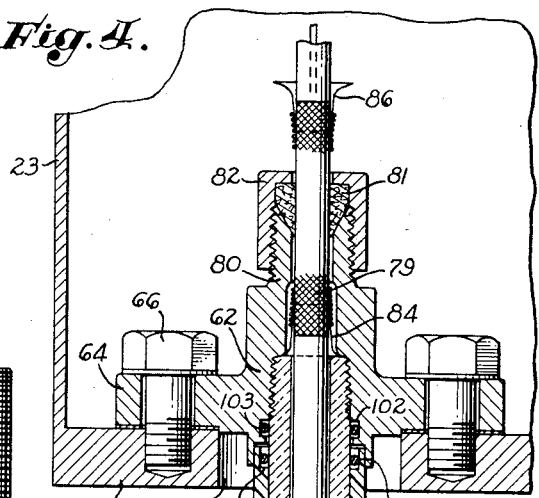
Fig. 4 is a vertical sectional view taken along the line 4—4 of Fig. 1 and illustrates a second embodiment of the invention as applied to an inlet bushing.
Figure 5:
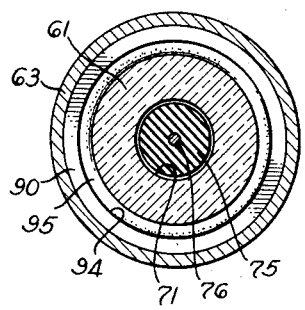
Fig. 5 is a transverse sectional view taken along the line 5—5 of Fig. 4.
Figures 6, 7:
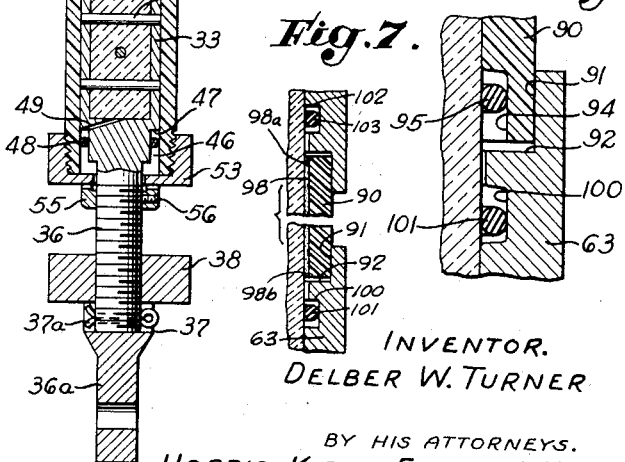
Fig. 6 is an enlarged detail view of one of the sealing assemblages of Fig. 4.
Fig. 7 is an enlarged view showing alternative structures that can be used at the top and bottom of the insulator structure of the invention.

In the inlet bushing embodiment of the invention, namely the insulator structure 19 illustrated in Figs. 4, 5 and 6, the elongated core member 60 comprises a hollow central section 61 formed of the aforesaid first insulation material with upper and lower end members 62 and 63 fixed thereto, as by threading. The upper end member 62 is enlarged to form a flange 64 held in closing relation with an opening 65 of the wall 22 by cap screws 66. In this way, detaching the plate 24 and the cap screws permits the complete inlet bushing to be raised from the housing 23 for inspection. As in Fig. 2, the core member 60 is supported from its end member 62 and is the load-carrying member of the structure.

The lower end member 63 clamps a contact member 68 with a flange 69 thereof against the end of the central section 61 and with a neck 70 thereof extending into the lower end of a passage 71 centrally through the central section 61. A threaded portion 72 with a conventional nut can be electrically connected to the electrode 15 by a conductor 73 (Figs. 1 and 4).

A short length of high-voltage cable 75 extends downwardly in the passage 71 with its exposed conductor 76 extending into the neck 70 of the contact member 68. The insulation sheath of this cable, indicated at 78 is formed of insulating material of sufficient resistivity to withstand the high potential of the source 20, being preferably a wrapping of successive layers of tape made of polytetrafluoroethylene or polytrifluorochloroethylene.

The sheath 78 is covered with a braided metal sleeve 79 in an upper section thereof within a head 80 of the upper end member 62, the braided sleeve continuing through an annular sealing member 81 compressed by a gland 82 around the sleeved section of the cable. A corona shield 84 has its flared end clamped between the end of the central section 61 and the end wall of the threaded cavity of the end member 62 receiving it. The tubular portion of the corona shield 84 is wire-wrapped against the braided sleeve 79. A similar corona shield 86 is wire-wrapped to the braided sleeve above the gland but below a connector 87 (Fig. 1) detachably attaching the upper end of the conductor 76 to the conductor extending laterally from the housing 23 to the source 20.

Surrounding the elongated core member 60 but expansive or contractive lengthwise relative thereto is a tubular member 90 having its lower end loosely extending into a recess 91 (Fig. 6) of the lower end member 63 bounded by an end wall 92. Such lower end is itself internally recessed to form an annular chamber 94 having its innermost end communicating with the small annular space between the members 60 and 90 and having its outermost end communicating with the surrounding oil zone of the main container through the loose fit between the lower end of the member 90 and the outer wall of the recess 91. An O-ring 95, positioned and functioning as previously described, is pressurally movable in the annular chamber 94 and separates the contaminated oil reaching the recess 91 from an incompressible fluid filling the inner end of the annular chamber 94 and the aforesaid small annular space between the members 60 and 90. In the same manner an O-ring 96 pressurally movable in an annular chamber 97 at the top of the tubular member 90 separates the contaminated oil or other fluid near the opening 65 from the aforesaid incompressible fluid, which may desirably be a silicone grease filling all internal spaces between the O-rings 95 and 96. As previously described, the O-rings thus substantially equalize the pressures on opposite sides of the tubular member 90 while softened due to high ambient temperature and prevent the contaminants of the oil zone from reaching the interior of the insulator structure. At the same time, the tubular member 90 is mounted for free expansive and contractive movement in its softened or weakened state, this being insured by making the overall length of the tubular member 90 less than the distance between the shoulder 92 and the corresponding shoulder at the upper end of the structure. The presence of the O-rings 95 and 96 is preferred but it is sometimes possible to eliminate them and their respective chambers 94 and 97, permitting both ends of the dielectric liquid to be in communication with the surrounding oil zone as suggested in Fig. 7 wherein the minute passages formed by the fits of the elements are exaggerated in size to show the dielectric liquid 98 with its ends 98a and 98b in communication with the surrounding oil zone.

In the embodiment of Fig. 4, the inner cylindrical wall of the lower end member 63 below the end wall 92 is internally recessed to form a longitudinally elongated annular chamber 100 (Fig. 6) containing intermediate its ends an O-ring 101 separating the contaminated oil reaching the recess 91 from the threads connecting the lower end of the section 61 and the lower end member 63. This prevents any contaminated oil from passing the threads and reaching the interior of the core member 60.

In like manner, the upper or flanged end member 62 is internally recessed to form an annular chamber 102 containing an O-ring 103 separating the contaminants of the oil zone from the threaded connection at this end. The O-rings 101 and 103 can sometimes be eliminated and reliance placed on the threaded connections for preventing the contaminants and the high pressure of the oil zone from reaching the passage 71 and the cable 75 therein. The O-rings are useful, however, particularly if they confine a body of silicone grease between them and the adjacent threads and thus prevent any possibility of contaminants reaching and passing or deteriorating the threaded connection.

In each of the embodiments of the invention it is desirable to employ piston-like pressure-transfer elements at each end of the structure. In less critical installations, however, it is possible to use a pressure-transfer element at only one end to permit relative movement between the core and tubular members at this end while in fluid-tight relationship, the other end of the structure being otherwise sealed or fixed to the adjacent end member. Also it is possible to dispense with the pressure-transfer elements in some instances, as mentioned above. Further, it is possible to use diaphragm type pressure-transfer elements or piston-like sealing members not strictly of O-ring shape.

Various changes can be made in the illustrated embodiments without departing from the spirit of the invention and will be apparent to those skilled in this art.

I claim as my invention:

1. In combination with electric equipment having an oil zone subject to changes in pressure and temperature and bounded by a wall, an insulator structure including: an elongated core member having an elongated central section formed of a first electric insulation material and electrically conducting end members rigidly connected to the ends at such central section; a plastic tubular member subject to plastic flow upon increase in pressure and temperature in said oil zone, the interior of said tubular member relatively snugly surrounding the periphery of said elongated core member with only a narrow annular space therebetween; means for attaching said core member to said wall with the exterior of said tubular member and an end of said annular space exposed to the pressure variations of said oil zone; and a freely movable pressure-transfer element separating said end of said annular space from said oil zone and transferring substantially all changes in pressure in the oil zone to said annular space to maintain the pressures on opposite sides of said tubular member substantially equal while separating said annular space from the oil in said oil zone.

2. A combination as defined in claim 1 in which said annular space is of substantially uniform width throughout the length thereof and contains a body of an insulating fluid, and in which said movable pressure-transfer element is a piston-like element separating said insulating fluid from the oil zone and movable to transfer pressure therebetween.

3. A combination as defined in claim 1 including an annular chamber at said end of said annular space pressurally connecting said annular space and said oil zone, said movable pressure-transfer element comprising a resilient O-ring filling a cross-section of said annular space and movable therein to maintain said pressures on opposite sides of said tubular member substantially equal, said chamber being bounded outwardly by a surface of said tubular member and inwardly by a surface of said elongated core member.

4. A combination as defined in claim 3 in which said surface of said elongated core member is an external surface of one of said end members.

5. A combination as defined in claim 3 in which said surface of said elongated core member is an external surface of said central section of said core member.

6. In combination with electric equipment having an oil zone subject to changes in pressure and temperature and bounded by a wall, an insulator structure including: a mechanical-load-carrying elongated core member having an elongated central section formed of a first electric insulation material with electrically conducting end members rigidly connected to the ends of such central section; a plastic tubular member subject to plastic flow upon increase in temperature and pressure in said oil zone, said tubular member being positioned around said elongated core member with a narrow annular space therebetween, said annular space having opposed ends and containing a column of incompressible insulating fluid having opposed ends; means for attaching one of said end members to said wall to mount said members in said zone, the exterior of said tubular member and said opposed ends of said annular space being exposed to the pressure variations of said oil zone; and two freely-displaceable pressure-transfer elements respectively separating the ends of said annular space from said oil zone, said pressure-transfer elements providing outer surfaces in pressural communication with said oil zone and inner surfaces in pressural communication with the respective opposed ends of said column, each of said pressure-transfer members being freely displaceable in response to differences in pressure on its inner and outer surfaces to maintain the pressures on opposite sides of said tubular member substantially equal.

7. A combination as defined in claim 6 including enlarged annular chambers at said ends of said annular space and respectively communicating with the ends thereof, each annular chamber having a portion communicating pressurally with said oil zone, each annular chamber being bounded outwardly by a surface of said tubular element and inwardly by a surface of said elongated core member, said movable pressure-transfer members comprising resilient O-rings filling cross-sections of the respective annular spaces and movable therein to maintain said pressures on opposite sides of said tubular element substantially equal.

8. An insulator structure for use in a space subject to pressure variations at high temperature, said insulator comprising: an elongated mechanical-load-carrying core member circular in cross-section having an elongated central section formed of a first electric insulation material and electrically conducting end members rigidly connected to the ends of such central section; a circular tubular member formed of a second electric insulation material coaxially surrounding said elongated core member, there being a small annular space between the outer circular surface of said elongated core member and the inner circular surface of said tubular member, said annular space having opposite ends, said second electric insulation material being of low strength and rigidity and subject to plastic flow at said high temperature as compared with said first electric insulation material, one of said core and tubular members providing an annular recess adjacent each of said opposite ends cooperating with the circular surface of the other of such members in defining annular chambers respectively interconnecting said opposite ends with the space exterior of said tubular member; and an annular pressure-transfer member filling a cross-section of each annular chamber and slidable therein in a direction parallel to the axis of said core and tubular members to respectively transmit pressure changes in said exterior space to said opposite ends of said small annular space and thus substantially equalize the pressures on the internal and external surfaces of said tubular member.

9. An insulator structure as defined in claim 8 in which said core member is connected to one of said end members by threads, and including another annular pressure-transfer member disposed between said core member and that one of said end members threaded thereto to seal said threads from the oil in said oil zone.

10. In combination with electric equipment having an oil zone bounded by a wall and adapted to contain a particle-contaminated oil subject to pressure variations at high temperature, an insulator structure including: an elongated mechanical-load-carrying core member circular in cross-section having an elongated central section formed of a first electric insulation material; an upright tubular member formed of a second electric insulation material having a longitudinal circular opening receiving said elongated central section of said core member, there being a minute annular space between the outer and inner circular surfaces of the respective elongated core member and tubular member, said minute annular space having opposite ends, said second electric insulation material being of low strength and rigidity at said high temperature as compared with said first electric insulation material; a member attached to said core member near the lower end thereof on which the weight of the lower end of said upright tubular member is supported at least in part, the upper end of said tubular member being free to expand and contract vertically relative to the upper end of said core member; a dielectric fluid filling said small annular space; means for connecting the upper end of said core member to said wall to support said members within said oil zone, said opposite ends of said annular space being respectively in pressural communication with said oil zone; and freely-displaceable pressure-transfer elements respectively closing said ends of said annular space from said oil zone for equalizing the pressures inside and outside said tubular member.

11. In combination with electric equipment having an oil zone bounded by a wall and adapted to contain a particle-contaminated oil subject to pressure variations at high temperature, an insulator structure including: an elongated upright mechanical-load-carrying core member circular in cross-section having an elongated central section formed of a first electric insulation material; an upright tubular member formed of a second electric insulation material having a longitudinal circular opening receiving said elongated central section of said core member, there being an upright minute annular space between the outer and inner circular surfaces of the respective elongated core member and tubular member, said minute annular space having opposite ends, said second electric insulation material being of low strength and rigidity at said high temperature as compared with said first electric insulation material; a dielectric fluid of grease consistency filling said small annular space, said annular space being sufficiently narrow to support said grease against flow therefrom into said oil zone; and means for connecting one end of said core member to said wall to support said members within said oil zone, said opposite ends of said annular space being respectively in pressural communication with said oil zone to equalize the pressures inside and outside said tubular member.

12. In combination with electric equipment having an oil zone bounded by a wall and adapted to contain a particle-contaminated oil subject to pressure variations at high temperature, an insulator structure including: an elongated upright mechanical-load-carrying core member circular in cross-section having an elongated central section formed of a first electric insulation material; an upright tubular member formed of a second electric insulation material having a longitudinal circular opening receiving said elongated central section of said core member, there being an upright minute annular space between the outer and inner circular surfaces of the respective elongated core member and tubular member, said minute annular space having opposite ends, said second electric insulation material being of low strength and rigidity at said high temperature as compared with said first electric insulation material; a dielectric fluid filling said small annular space, said outer and inner circular surfaces forming a snug fit whereby said annular space is sufficiently narrow to retain said dielectric fluid by capillary and viscosity forces, said dielectric fluid having surfaces at said opposite ends of said annular space exposed to the oil zone; and means for connecting one end of said core member to said wall to support said members within said oil zone, said opposite ends of said annular space being respectively in pressural communication with said oil zone to equalize the pressures inside and outside said tubular member.

13. In combination with electric equipment having an oil zone bounded by a wall and adapted to contain under high temperatures and pressures an oil contaminated by dispersed conducting particles in amount at least .001%, an insulator structure including: an elongated mechanical-load-carrying core member having a section formed of a first electric insulation material of relatively high strength and rigidity at said high temperatures and pressures, said core member having a cylindrical external surface; a tubular member formed of a second electric insulation material of relatively low strength and rigidity at said high temperatures and pressures and subject to plastic flow upon increase in the values of such temperature and pressure, said second electric insulation material being a material selected from the class consisting of polytetrafluoroethylene and polytrifluorochloroethylene, said tubular member having an outer cylindrical surface exposed to the oil in said oil zone and having an internal cylindrical surface surrounding and relatively snugly fitting the cylindrical exterior surface of said core member to be supported thereby while leaving only a narrow annular space therebetween, said narrow annular space having opposite ends exposed to the pressure of said oil zone; means for supporting said tubular member around said elongated core member for relative longitudinal expansive and contractive movement therebetween; and two freely-displaceable pressure-transfer elements respectively separating the ends of said annular space from said oil zone, said pressure-transfer elements providing outer surfaces in pressural communication with said oil zone and inner surfaces in pressural communication with the opposed ends of said annular space, each of said pressure-transfer members being freely displaceable in response to differences in pressure on its inner and outer surfaces to maintain the pressure on opposite sides of said tubular member substantially equal.

14. A combination as defined in claim 13 including an upper end member and means for connecting same to said wall, said upper end member including a threaded cavity, the upper end of said core member being threaded into said cavity, and including another freely-displaceable pressure-transfer element blocking communication of said threads with said oil in said oil zone.

15. In combination with electric equipment having an oil zone bounded by a wall and adapted to contain a particle-contaminated oil subject to changes in pressure and temperature, an insulator structure including: an elongated mechanical-load-carrying tubular core member having an elongated central section formed of a first electric insulation material and upper and lower end members respectively threaded to the upper and lower ends of said central section; a plastic tubular member subject to plastic flow upon increase in pressure and temperature in said oil zone, the interior of said tubular member relatively snugly surrounding the periphery of said elongated tubular core member with only a narrow annular space therebetween, said annular space having upper and lower ends; two freely-displaceable pressure-transfer elements respectively separating the ends of said annular space from said oil zone, each element being freely displaceable in response to differences in pressure on inner and outer surfaces thereof respectively pressurally communicating with said oil zone and a corresponding end of said annular space, thereby maintaining the pressures on opposite sides of said tubular member substantially equal; means for sealing the threaded connection of one of said end members and said core member from the oil in said oil zone; and another freely-displaceable pressure-transfer element separating the threaded connection of the other of said end members and said core member from the oil in said oil zone.

16. A combination as defined in claim 15 including a high-voltage cable extending along the interior of said tubular core member and having a conductor connected to said lower end member.

References Cited in the file of this patent

UNITED STATES PATENTS

| 1,782,790 | Miller | Nov. 25, 1930 |
| 2,387,250 | Eddy | Oct. 23, 1945 |

FOREIGN PATENTS

| 785,377 | Great Britain | Oct. 30, 1957 |